(12) United States Patent
Rabbat et al.

(10) Patent No.: US 7,564,780 B2
(45) Date of Patent: Jul. 21, 2009

(54) TIME CONSTRAINED FAILURE RECOVERY IN COMMUNICATION NETWORKS

(75) Inventors: Richard R. Rabbat, San Francisco, CA (US); Ching-Fong Su, Milpitas, CA (US)

(73) Assignee: Fujitsu Limited, Kawasaki (JP)

( * ) Notice: Subject to any disclaimer, the term of this patent is extended or adjusted under 35 U.S.C. 154(b) by 887 days.

(21) Appl. No.: 10/759,698

(22) Filed: Jan. 15, 2004

(65) Prior Publication Data

US 2005/0188242 A1 Aug. 25, 2005

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |

(52) U.S. Cl. .................................. 370/228; 370/254
(58) Field of Classification Search ................ 370/228
See application file for complete search history.

(56) References Cited

U.S. PATENT DOCUMENTS

| 5,914,798 | A * | 6/1999 | Liu .............................. 398/7 |
| 6,728,205 | B1 * | 4/2004 | Finn et al. .................. 370/217 |
| 6,904,462 | B1 * | 6/2005 | Sinha ......................... 709/226 |
| 6,917,759 | B2 * | 7/2005 | de Boer et al. ................ 398/5 |
| 6,992,978 | B1 * | 1/2006 | Humblet et al. ............. 370/228 |
| 7,170,851 | B1 * | 1/2007 | Chen et al. ................. 370/222 |
| 2001/0003833 | A1 * | 6/2001 | Tomizawa et al. ........... 709/240 |
| 2002/0006112 | A1 * | 1/2002 | Jaber et al. .................. 370/238 |
| 2002/0131424 | A1 * | 9/2002 | Suemura ..................... 370/400 |
| 2002/0138645 | A1 * | 9/2002 | Shinomiya et al. .......... 709/238 |
| 2002/0162045 | A1 * | 10/2002 | Shiragaki ....................... 714/4 |
| 2002/0172149 | A1 * | 11/2002 | Kinoshita et al. ........... 370/216 |
| 2003/0140144 | A1 * | 7/2003 | Raguram et al. ............ 709/226 |
| 2004/0111651 | A1 * | 6/2004 | Mukherjee et al. .............. 714/4 |
| 2004/0190441 | A1 * | 9/2004 | Alfakih et al. .............. 370/216 |
| 2004/0218525 | A1 * | 11/2004 | Elie-Dit-Cosaque et al. ..... 370/223 |

OTHER PUBLICATIONS

Berger, L., editor, "Generalized Multi-Protocol Label Switching (GMPLS) Signaling Resource ReserVation Protocol-Traffic Engineers (RSVP-TE) Extensions", Internet Draft, RFC 3473 (40 pages), Jan. 2003.

Ashwood-Smith, P., Berger, L., editors, Generalized Multi-Protocol Label Switching (GMPLS) Signaling Constraint-based Routed Label Distribution Protocol (CR-LDP) Extensions, Internet draft, RFC 3472 (23 pages), Jan. 2003.

(Continued)

*Primary Examiner*—Hassan Kizou
*Assistant Examiner*—Andrew Chriss
(74) *Attorney, Agent, or Firm*—Baker Botts L.L.P.

(57) ABSTRACT

A network includes multiple nodes interconnected to form a mesh topology. These nodes support working paths for the transmission of data and protection paths to provide for recovery in the event of failures on working paths. To select protection paths, elements of the network consider timing constraints associated with failure recovery.

30 Claims, 2 Drawing Sheets

OTHER PUBLICATIONS

Srivastava, S., et al. "Benefits of Traffic Engineering Using QoS Routing Schemes and Network Controls", Computer Communication, paper, University of Missouri-Kansas City (22 pages), 2002.

Su, Xun. and Su, Ching-Fong., "An online distributed protection algorithm in WDM networks", ICC 2001, (6 pages), 2001.

Sengupta, S and Ramamurthy, R.; "From Network Design to Dynamic Provisioning and Restoration in Optical Cross-Connect Mesh Networks: An Architectural and Algorithmic Overview", 2001.

Iraschko, R. and W. D. Grover, "A Highly Efficient Path-Restoration Protocol for Management of Optical Network Transport Integrity," IEEE Journal on Selected Areas in Communications, 18(5); 779-794 (33 pages), May 2000.

Yuan, X., "On the Extended Bellman-Ford Algorithm to Solve Two-Constrained Quality of Service Routing Problems," ICCCN 1999 (7 pages), 1999.

Chen, S, Nahrstedt, K., "On Finding Multi-Constrained Paths", ICC 1998-(6 pages), 1998.

* cited by examiner

TIME CONSTRAINED FAILURE RECOVERY IN COMMUNICATION NETWORKS

TECHNICAL FIELD OF THE INVENTION

The present invention relates generally to communication networks and, more particulary, to time constrained failure recovery in communication networks.

BACKGROUND OF THE INVENTION

Increasingly, networks rely upon optical transmission systems to transport data. To provide robust service, optical systems often accommodate failure protection schemes. For example, given a first optical path in use for transmissions, the network may maintain a second path for use in case of failure on the first path.

SUMMARY OF THE INVENTION

In accordance with the present invention, techniques for time constrained failure recovery communication networks are provided. According to particular embodiments, these techniques enable network elements to select protection paths based upon time constraints and network configuration information.

According to a particular embodiment, a method for provisioning protection paths determines network configuration information for a network formed by a set of nodes. The method identifies a working path from a source node to a destination node spanning one or more intermediate nodes, wherein the source node, the destination node, and the intermediate nodes are all nodes in the network. The method determines a timing constraint for failure recovery, identifies potential nodes in the network that satisfy the timing constraint based on the network configuration information, and selects a protection path from the source node to the destination node spanning a second set of one or more intermediate nodes, the second intermediate nodes selected from the potential nodes. The method further sets up the protection path.

Embodiments of the invention provide various technical advantages. These techniques enable network elements to select protection paths based upon time constraints. This can enable differentiation between services offered to various network customers. These techniques may also enhance the scalability of networks. For example, these techniques may maintain constant complexity of protection path calculations, independent of the number of connections and wavelengths used in an optical network. Furthermore, these techniques can take account for hardware limitations inherent in protection path switching. Furthermore, embodiments may provide for fast computation and selection of protection paths.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
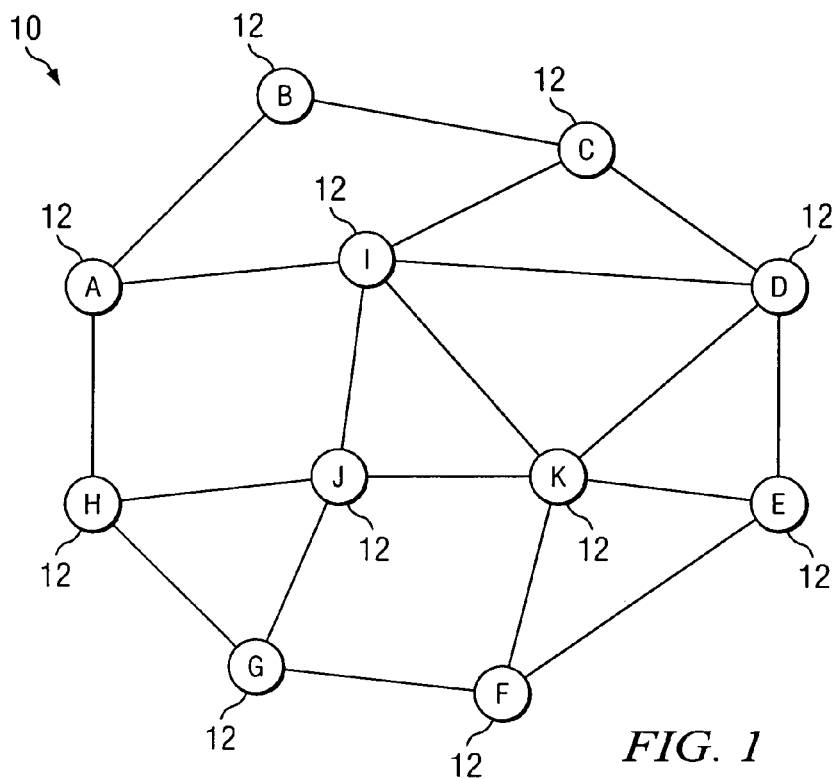
FIG. 1 illustrates a communication network that includes network nodes that operate in accordance with various embodiments of the present invention.

FIG. 1 illustrates a portion of a communication network, indicated generally at 10, that includes a number of network nodes 12 interconnected in a mesh topology. In general, network 10 supports data transport between nodes 12. To provide fault tolerance, network 10 further supports selection, establishment, and use of protection paths as backups to working paths transporting data. To select protection paths, nodes 12 account for timing constraints associated with activation of a protection path in response to a resource failure.

Network 10 represents any suitable collection and arrangement of elements supporting transport of data communication. As illustrated, network 10 includes multiple nodes 12 interconnected in a mesh topology. Thus each node 12 links to at least two other nodes 12 within network 10. Each node 12 represents hardware, including any appropriate controlling logic, capable of linking to other network equipment and transporting data communications. The mesh topology of network 10 permits any node 12 to transmit information to any other node 12 either directly or by way of one or more intermediate nodes 12. Moreover, this topology potentially allows for multiple routes between any two nodes 12, thus permitting the establishment of a working path for normal data transmissions and a protection path for use during fault conditions. According to particular embodiments, nodes 12 are optical communication nodes, and network 10 forms an optical transport network. The remainder of this discussion will focus primarily on the embodiment of network 10 and nodes 12 as optical equipment. However, it should be understood that the disclosed techniques may be used in any suitable type of network.

To support transmissions, nodes 12 configure light paths that pass from a source node 12 to a destination node 12, potentially passing through any number of intermediate nodes 12. This establishes a working path for data communications. To protect against a failure on the working path, nodes 12 may set up a protection path. In the event of a failure on the working path, nodes 12 on the protection path can quickly reconfigure to provide a recovery for the data communications. According to particular embodiments, establishment of a protection path creates two distinct physical pathways such that a single failure does not sever both the working path and the protection path. Node 12 may set up protection paths using a number of different techniques, including path protection, link protection, and node protection. In path protection, the working path and protection path each pass along completely different physical transmission links. A failure on any part of the working path results in a recovery to the protection path. In a link protection scheme, each individual node along a path provides a protection path to the next node along the path. Thus for this scheme, a failure will implicate recovery for only the path between two nodes 12. In a node protection scheme, each individual node along a path provides a protection path for the neighbors of its neighboring nodes. Thus for this scheme, a failure will implicate recovery for only the path to bypass a failing node 12.

As an example of path protection, consider a working path established from node 12 labeled A to node 12 labeled E using intermediate nodes 12 labeled B, C, and D. (path A-B-C-D-E). For this working path, network 10 provides a number of potential protection paths, such as path A-I-K-E. This example shows that the protection path may be selected such that no intermediate nodes 12 are shared between the working and protection paths, and thus provides an example of path protection, in that the entire working path is protected in case of failure on any part of the working path.

If a failure occurs on any proof of the working path, nodes 12 initiate restoration of the link using the selected protection path. For example, node 12 detecting a failure may send a message to each node in the protection path requesting recovery. According to particular embodiments, the detecting node 12 provides this message using a flooding technique in which a fault message is broadcast to every node 12 within network 10. This flooding of fault messages provides for quick distribution of failure information and permits each node 12 to respond appropriately. For example, upon failure of the link between node C and node D, node D may flood a fault message identifying this failure. Each other node 12 within network 10 receives this fault message and, if appropriate, reconfigures to enable protection paths implicated by this failure. Thus given the example working path and protection path and the fault message communicated by node D, nodes A, I, K, and E will reconfigure such that the A-I-K-E protection path takes over for the failed working path.

The time taken for this recovery may depend upon a number of factors, such as propagation times, processing times, and reconfiguration times. Given the example failure detailed above, the time taken to recover will be the highest of the times taken for each individual node 12 in the protection path to receive the fault notification and respond appropriately. In this instance, that will be the highest of times for nodes A, I, K, and E to receive the fault notification and respond. For each of these nodes 12, this recovery time will include the time taken for the detecting node 12 to discover the fault, the time taken for the fault message to propagate from the detecting node 12 to the receiving node 12, and the time taken within the receiving node 12 to appropriately respond to the fault message.

In order for network 10 to recover quickly from faults or within particular time constraints, nodes 12 enable selection of protection paths based upon time constraints. When selecting nodes 12 for a protection path, network 10 thus accounts for timing considerations to ensure that each node 12 selected for the protection path can respond to a fault condition within a predetermined period of time. For example, consider node A identifying a working path spanning A-B-C-D-E. To select a protection path, node A first identifies a timing constraint for recovery time and then identifies selected nodes 12 that can satisfy the timing constraint. For the protection path, node A can potentially use any of nodes F-K. However, node A uses the timing constraint to narrow down this list of potential nodes 12. For example, because of propagation times associated with a fault message transmitted from node D, node A may determine that nodes H and G cannot respond within the given time constraint. Node A may further determine that node F cannot respond in time given a failure notification from node B. Given these conditions, node A will identify nodes I, J, and K as potential nodes for use in a protection path. Node A may then run a protection path selection algorithm to select the protection path from among the identified potential nodes 12. By first considering timing constraints to narrow down the list of potential nodes 12 for use in a protection path, node A reduces the complexity of the operations and permits rapid identification of a suitable protection path. Moreover, this process enables nodes 12 to establish protection paths based upon any configured time constraints. Thus, for example, different customers may request different protection times based upon their data transmission needs. The following description with respect to FIG. 2 provides greater detail of elements within nodes 12 and information maintained within these elements to support selection of protection paths based upon timing constraints.

Figure 2:
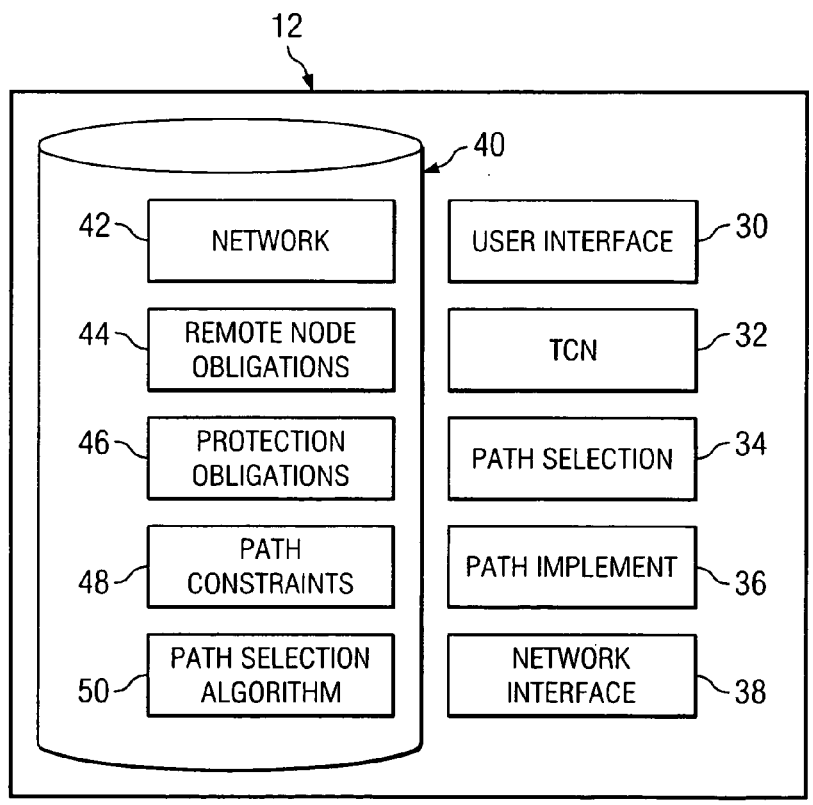
FIG. 2 is a block diagram illustrating exemplary functional components of a network node from the network.

FIG. 2 is a block diagram illustrating in greater detail exemplary functional elements of node 12. In this embodiment, node 12 includes a user interface 30, a time constrained neighborhood (TCN) module 32, a path selection module 34, a path implementation module 36, a network interface 38, and a memory module 40. In general, the elements of node 12 provide for data communication support, such as operation as a router, switch, or other suitable network component. Moreover, the elements of node 12 operate to identify other potential nodes 12 for a protection path based upon timing constraints and to select a protection path from among these potential nodes 12.

User interface 30 allows for interaction with administrators and/or other appropriate users of node 12. For example, user interface 30 may permit administrators to manage configurations and other operations of node 12, such as requesting path setups and setting time constraints. TCN module 32 identifies and selects potential nodes for protection paths based upon time constraints. For example, TCN module 32 can identify a number of potential nodes 12 for a protection path based upon a given time constraint and an identified working path. Path selection module 34 selects an appropriate protection path from among potential nodes 12 identified by TCN module 32. Path implementation module 36 then performs operations to set up the protection path. For example, path implementation module 36 may communicate management messages to other nodes 12 requesting those other nodes 12 to operate as protection nodes for an established working path.

Network interface 38 enables node 12 to connect to and interact with other network elements. For example, network interface 38 may include one or more connectors, ports, or other suitable equipment for linking to one or more other nodes 12. Network interface 38 may further include hardware and/or logic enabling node 12 to send and receive management information. For example, network interface 38 may enable node 12 to access an optical supervisory channel (OSC) for transmitting and receiving optical management communications. However, while illustrated as a single element of node 12, it should be understood that network interface 38 may encompass any suitable collection and arrangement of elements that enable node 12 to interconnect with other network equipment, such as other nodes 12 within network 10.

Memory module 40 maintains information for use by node 12 during operation. In the embodiment illustrated, memory module 40 includes network data 42, remote node obligations 44, protection obligations 46, path constraints 48, and a path selection algorithm 50. Network data 42 includes information detailing the topology, configuration, and characteristics of network 10. According to particular embodiments, this information includes propagation times between various network nodes 12, processing times for various operations, and response times for nodes 12 to perform operations. For example, propagation times may indicate how long it takes for a management message to propagate from a first node 12 to a second node 12. Similarly, a processing time may indicate how long it takes for nodes 12 to receive, examine, and forward fault messages. As another example, response times may indicate how long it takes for nodes 12 to reconfigure in response to a fault notification such that a protection path may be enabled. Thus in summary, network data 42 enables node 12 to determine the interconnection of other nodes 12 within network 10 and to determine response times for each of these nodes 12 in response to a fault notification from any other node 12.

Remote node obligations 44 include information detailing the protection path obligations of other nodes 12 with respect to working paths that include the present node 12. For example, within node A, this information would detail all other remote nodes 12 that must respond to a fault notification on a working path that involves node A. This information enables node 12 to determine the number of reconfigurations that will occur within a remote node 12 based upon any particular failure. Thus, for example, consider node H obligated as a protection path for three separate light paths on an optical link from node A to node B. If this link fails, node H may be required to make three separate reconfigurations in order to appropriately respond and switch over to the protection paths. If these reconfigurations occur in parallel, this will not impact timing constraints. However, if these reconfigurations happen in serial fashion, each additional obligation of node H can affect timing considerations for additional protection paths. Thus, remote node obligations 44 enables node 12 to take into account those protection path obligations currently in place within other nodes 12.

Protection obligations 46 includes a list of protection path obligations of node 12 to other nodes 12. This information enables node 12 to appropriately respond to received fault notifications. For example, node A may maintain a list of protection obligations with respect to other nodes 12 detailing required reconfigurations of node A in response to received fault notifications. Upon receiving a fault notification from node D, node A may access these protection obligations 46 to determine whether a reconfiguration is required.

Path constraints 48 includes information detailing timing considerations for protection paths within network 10. Thus path constraints 48 may include a set of standard recovery timing constraints, administrator configured timing constraints, recovery timing constraints for specific portions of network 10, or any other suitable information for use in identifying and/or determining a timing constraint for use during selection of a protection path for a given working path. According to particular embodiments, these constraints may be configured separately for each working path or group of working paths according to any suitable considerations. For example, network 10 may provide various levels of service based upon user needs.

Path selection algorithm 50 includes logic for selecting a protection path from among a set of potential nodes 12. Path selection algorithm 50 may take into account any suitable criteria and configurations in selecting the appropriate protection path. During operation, path selection module 34 may execute path selection algorithm 50 to select a protection path from among potential nodes 12 identified by TCN module 32.

To establish the data maintained within memory module 40, node 12 may communicate information with other nodes 12 within network 10. According to particular embodiments, at setup or other appropriate time, nodes 12 within network 10 may advertise various configuration and operational information. For example, each node 12 may advertise its available connections, times taken for various processing operations and reconfigurations, and whether the node 12 supports parallel or sequential reconfiguration of light paths. By collecting this information from other nodes 12, node 12 can establish the data within memory module 40 for use during setup of working and protection paths.

Thus during operation, node 12 uses information maintained within memory module 40 to identify and select working and protection paths for data transport. Node 12 then operates to provide data transport and, in fault conditions, provides recovery as appropriate.

However, while the embodiment illustrated and the preceding description focus on a particular embodiment of node 12 that includes specific elements, network 10 contemplates node 12 having any suitable combination and arrangement of elements for providing network connectivity and for selecting protection paths based upon time constraints. Therefore, the modules and functionalities described may be separate or combined as appropriate, and some or all of the functionalities of node 12 may be performed by logic encoded in media, such as software and/or programmed logic devices. Moreover, while illustrated in primarily functional elements, network 10 contemplates node 12 incorporating any suitable number and type of elements, such as processors, memory devices, network interfaces, and other elements suitable for providing the functionalities described in addition to any other suitable operations. For example, node 12 may include any number of suitable elements to support network communications, failure detection, and other suitable operational functions.

Figure 3:
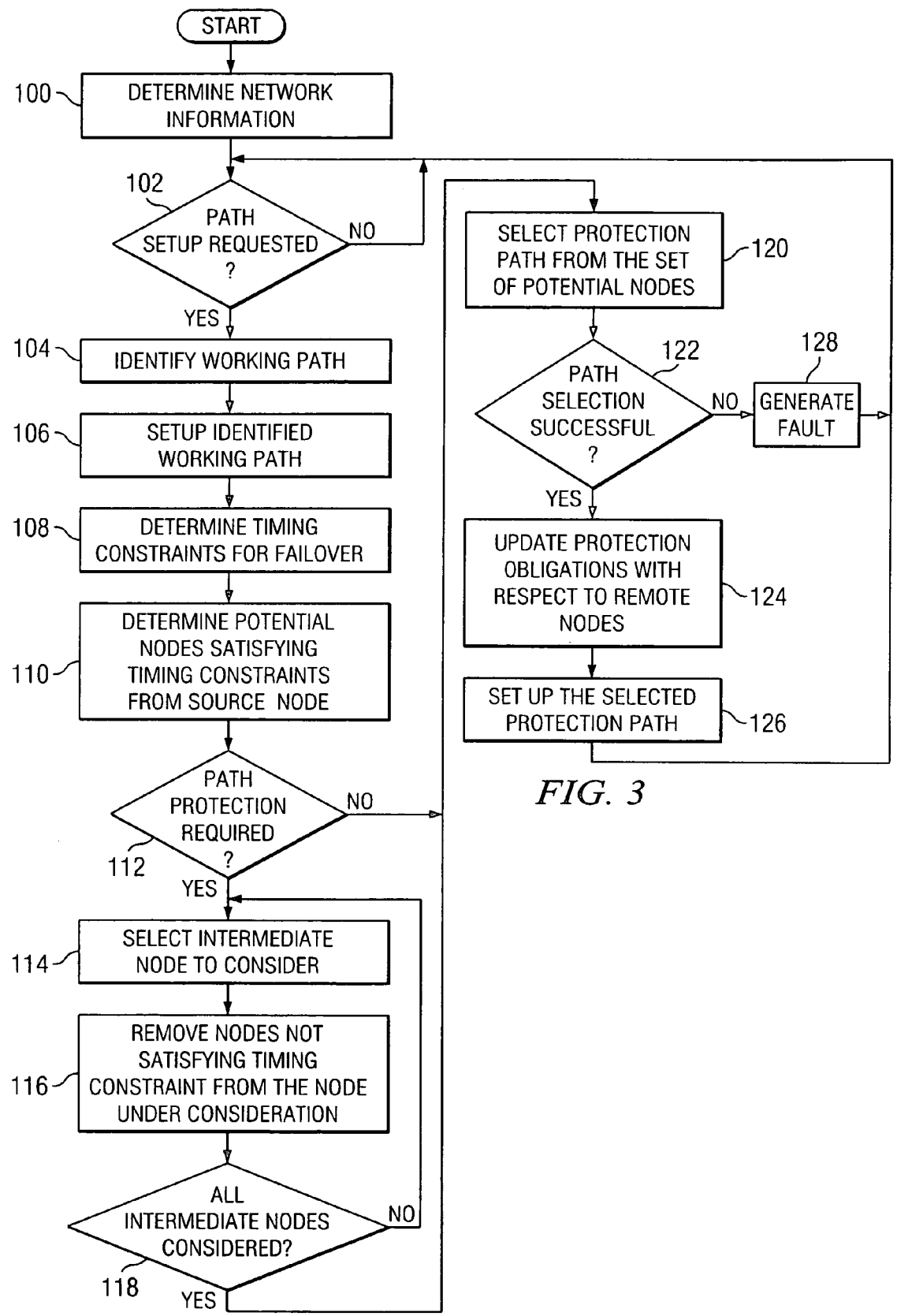
FIG. 3 is a flowchart illustrating a method for identifying potential network nodes for a protection path and selecting a protection path from these potential nodes based upon time constraints and network configurations.

FIG. 3 is a flowchart illustrating a method for identifying potential nodes 12 for a protection path based upon timing constraints and selecting a protection path from among the identified potential nodes 12. The following description focuses on the operation of node 12 operating as a source node in making these determinations. However, it should be understood that other nodes 12, whether acting as intermediate or destination nodes for a path, may perform similar functions, and that network 10 may include other suitable components for performing similar functionality in identifying and setting up protection paths.

Source node 12 determines network information at step 100. For example, as previously discussed, nodes 12 within network 10 may exchange information detailing topological and timing characteristics within network 10. Source node 12 then monitors for path setup requests at step 102. For example, source node 12 may wait for requests to establish a working path with a protection path. Upon receiving a suitable request, source node 12 identifies a working path at step 104. Node 12 may identify this working path using any suitable criteria, such as based upon configurations of network 10. For example, the setup request may specify particular nodes 12 for the working path. Alternatively, the request may specify a source and destination node and permit node 12 to select appropriate intermediate nodes 12 to fulfill the request. Thus as shown by these two examples, system 10 contemplates source node 12 using any suitable technique for identifying a working path. After identifying the working path, source node 12 sets up the identified working path at step 106. For example, source node 12 may communicate management messages using an optical supervisory channel to notify other nodes 12 to set up the working path.

Source node 12 determines timing constraints for failure recovery at step 108. For example, node 12 may access path constraints 48 to determine a timing value specifying a maximum recovery time given a failure on the working path. Alternatively or additionally, node 12 may receive configuration information from administrators or other elements of network 10 specifying these timing constraints. Based upon the timing constraint, node 12 determines potential intermediate nodes 12 satisfying the timing constraint with respect to source node 12 at step 110. This step determines those remote nodes 12 that can receive and respond to a fault notification from the source node within the specified time constraint. For this step, node 12 may take into account information such as network data 42, remote node obligations 44, and protection obligations 46. Those nodes 12 selected as potential nodes in this step will thus be able to receive fault notifications from the source node and reconfigure to establish the protection path within the specified timing constraint.

If providing for path protection, as opposed to link or node protection, source node 12 provides an alternate path based upon a failure at any point along the working path. Thus if path protection is provided, source node 12 takes into account timing considerations based upon the other nodes 12 within the selected working path at steps 114 through 118. In the case of providing node protection, source node 12 takes into account timing constraints from nodes adjacent to the protected node. In the case of providing link protection, source node 12 takes into account timing constraints from nodes adjacent to the protected link. However, in the flowchart, steps 114 through 118 detail the process for source node 12 to determine timing constraints for each node along the path, thus supporting path protection.

At step 114, source node 12 identifies an intermediate node 12 to consider and then removes from the list of potential nodes those nodes that do not satisfy the timing constraint with respect to the node under consideration at step 116. Source node 12 continues this process until all other nodes 12 on the working path have been considered. Thus after this process, source node 12 has developed a list of potential intermediate nodes 12 that satisfy the timing constraint given a fault at any node 12 along the selected working path. Alternatively, for node or link protection, the list of potential nodes 12 will reflect timing constraints for the nodes implicated by the particular protection scheme.

After identifying the list of potential intermediate nodes 12, source node 12 selects a protection path from the set of potential nodes 12 at step 120. For example, source node 12 may apply path selection algorithm 50 to the potential nodes 12 to determine a protection path. If this path selection is successful, source node 12 updates protection obligations with respect to remote nodes at step 124 and sets up the selected protection path at step 126. By updating the obligations, such as remote node obligations 44, source node 12 permits itself to properly calculate future timing considerations during subsequent protection path setup operations.

If the path selection is not successful, source node 12 may generate a fault at step 128. For example, if the list of potential nodes 12 does not identify sufficient links to establish a protection path, source node 12 may generate a fault. In response, an administrator or other suitable operator may take appropriate actions, such as relaxing timing constraints, reconfiguring network equipment, or alerting the customer of the path setup failure.

The preceding flowchart illustrates a particular method for a source node to identify a set of potential intermediate nodes 12 for a protection path and to select and establish a protection path from among those potential nodes 12. However, this flowchart illustrates only an exemplary method of operation, and network 10 contemplates nodes 12 using any suitable techniques, elements, and applications for performing these functions. Thus, many of the steps in this flowchart may take place simultaneously and/or in different orders than as shown. In addition, nodes 12 may use methods with additional steps, fewer steps, so long as the methods remain appropriate. Moreover, other elements of network 10, such as intermediate nodes 12, destination nodes 12, or other suitable components may perform similar techniques to identify potential nodes 12 for a protection path based upon timing constraints and to select a protection path from among these potential nodes 12.

Although the present invention has been described in several embodiments, a myriad of changes and modifications may be suggested to one skilled in the art, and it is intended that the present invention encompass such changes and modifications as fall within the present appended claims.

What is claimed is:

1. A method for a network node to provision protection paths comprising:
   determining network configuration information for a network formed by a plurality of nodes, wherein the network configuration information comprises topological information and timing information, wherein the topological information describes the interconnections between the nodes in the network, and wherein the timing information includes data regarding response times for the nodes in the network;
   identifying a working path from a source node to a destination node spanning one or more intermediate nodes, wherein the source node, the destination node, and the intermediate nodes are all nodes in the network;
   determining a timing constraint for failure recovery;
   identifying potential nodes in the network that satisfy the timing constraint based on the network configuration information;
   selecting a protection path from the source node to the destination node spanning a second set of one or more intermediate nodes, the second intermediate nodes selected from the potential nodes; and
   setting up the protection path by notifying the second intermediate nodes to set up the protection path wherein the steps of determining network configuration information, identifying the working path, determining the timing constraint, identifying potential nodes in the network, selecting the protection path, and setting up the protection path are performed by the network node.

2. The method of claim 1, wherein the timing information indicates propagation delays for control messages passing between the nodes in the network and reconfiguration delays for the nodes in the network to reconfigure in the event of a failure recovery.

3. The method of claim 2, wherein identifying the potential nodes that satisfy the timing constraint comprises identifying selected ones of the nodes in the network that can provide failure recovery within the timing constraint based upon the propagation delays and the reconfiguration delays.

4. The method of claim 1, further comprising maintaining obligation information specifying a plurality of remote node obligations, each remote node obligation indicating, with respect to one of the nodes in the network, obligations of other ones of the nodes in the network given a failure of the one node.

5. The method of claim 4, wherein identifying the potential nodes in the network that satisfy the timing constraint further comprises identifying the potential nodes in the network that satisfy the timing constraint based on the network configuration information and the remote node obligations.

6. The method of claim 1, wherein determining the timing constraint comprises:
   identifying a class of service associated with the working path; and
   selecting the timing constraint based upon the class of service.

7. The method of claim 1, wherein determining the timing constraint comprises receiving a configured value for the working path.

8. The method of claim 1, wherein the network has a mesh topology, and wherein each of the nodes in the network comprises an optical network node.

9. The method of claim 1, further comprising:
identifying a fault condition at a reporting one of the nodes in the network;
generating a fault message identifying the fault condition; and
broadcasting the fault message to all of the nodes in the network.

10. The method of claim 1, wherein identifying the potential nodes that satisfy the timing constraint comprises determining selected ones of the nodes in the network that satisfy the timing constraint based upon a failure reported from any one of the source node, the destination node, and the intermediate nodes.

11. A computer readable medium storing logic for provisioning protection paths, the logic operable when executed by a computer to perform the steps of:
determining network configuration information for a network formed by a plurality of nodes, wherein the network configuration information comprises topological information and timing information, wherein the topological information describes the interconnections between the nodes in the network, and wherein the timing information includes data regarding response times for the nodes in the network;
identifying a working path from a source node to a destination node spanning one or more intermediate nodes, wherein the source node, the destination node, and the intermediate nodes are all nodes in the network;
determining a timing constraint for failure recovery;
identifying potential nodes in the network that satisfy the timing constraint based on the network configuration information;
selecting a protection path from the source node to the destination node spanning a second set of one or more intermediate nodes, the second intermediate nodes selected from the potential nodes; and
setting up the protection path.

12. The computer readable medium of claim 11, wherein the timing information indicates propagation delays for control messages passing between the nodes in the network and reconfiguration delays for the nodes in the network to reconfigure in the event of a failure recovery.

13. The computer readable medium of claim 12, the logic further operable when executed to identify the potential nodes that satisfy the timing constraint by identifying selected ones of the nodes in the network that can provide failure recovery within the timing constraint based upon the propagation delays and the reconfiguration delays.

14. The computer readable medium of claim 12, the logic further operable when executed to maintain obligation information specifying a plurality of remote node obligations, each remote node obligation indicating, with respect to one of the nodes in the network, obligations of other ones of the nodes in the network given a failure of the one node.

15. The computer readable medium of claim 14, the logic further operable when executed to identify the potential nodes in the network that satisfy the timing constraint by identifying the potential nodes in the network that satisfy the timing constraint based on the network configuration information and the remote node obligations.

16. The computer readable medium of claim 11, the logic further operable when executed to determine the timing constraint by:
identifying a class of service associated with the working path; and
selecting the timing constraint based upon the class of service.

17. The computer readable medium of claim 11, the logic further operable when executed to determine the timing constraint by receiving a configured value for the working path.

18. The computer readable medium of claim 11, wherein the network has a mesh topology, and wherein each of the nodes in the network comprises an optical network node.

19. The computer readable medium of claim 11, the logic further operable when executed to perform the steps of:
identifying a fault condition at a reporting one of the nodes in the network;
generating a fault message identifying the fault condition; and
broadcasting the fault message to all of the nodes in the network.

20. The computer readable medium of claim 11, the logic further operable when executed to identify the potential nodes that satisfy the timing constraint by determining selected ones of the nodes in the network that satisfy the timing constraint based upon a failure reported from any one of the source node, the destination node, and the intermediate nodes.

21. A network node comprising:
a network interface operable to couple to a network formed by a plurality of other nodes,
a memory maintaining network configuration information for the network wherein the network configuration information comprises topological information and timing information, wherein the topological information describes the interconnections between the nodes in the network, and wherein the timing information includes data regarding response times for the nodes in the network; and
a controller in communication with the network interface and the memory operable to:
identify a working path from the network node to a destination node spanning one or more intermediate nodes, wherein the destination node and the intermediate nodes are all other nodes in the network;
determine a timing constraint for failure recovery;
identify potential nodes in the network that satisfy the timing constraint based on the network configuration information;
select a protection path from the network node to the destination node spanning a second set of one or more intermediate nodes, the second intermediate nodes selected from the potential nodes; and
initiate setup of the protection path.

22. The network node of claim 21, wherein the timing information indicates propagation delays for control messages passing between the nodes in the network and reconfiguration delays for the nodes in the network to reconfigure in the event of a failure recovery.

23. The network node of claim 22, wherein the controller is further operable to identify the potential nodes that satisfy the timing constraint by identifying selected ones of the nodes in the network that can provide failure recovery within the timing constraint based upon the propagation delays and the reconfiguration delays.

24. The network node of claim 21, wherein the memory is further operable to maintain obligation information specifying a plurality of remote node obligations, each remote node obligation indicating, with respect to one of the nodes in the network, obligations of other ones of the nodes in the network given a failure of the one node.

25. The network node of claim 24, wherein the controller is further operable to identify the potential nodes in the network that satisfy the timing constraint further by identifying the potential nodes in the network that satisfy the timing constraint based on the network configuration information and the remote node obligations.

26. The network node of claim 21, wherein the controller is further operable to determine the timing constraint by:
   identifying a class of service associated with the working path; and
   selecting the timing constraint based upon the class of service.

27. The network node of claim 21, wherein the controller is further operable to determine the timing constraint by receiving a configured value for the working path.

28. The network node of claim 21, wherein the network has a mesh topology, and wherein each of the nodes in the network comprises an optical network node.

29. The network node of claim 21, wherein the controller is further operable to:
   identify a fault condition at a reporting one of the nodes in the network;
   generate a fault message identifying the fault condition; and
   broadcast the fault message to all of the nodes in the network using the network interface.

30. The network node of claim 21, wherein the controller is further operable to identify the potential nodes that satisfy the timing constraint by determining selected ones of the nodes in the network that satisfy the timing constraint based upon a failure reported from any one of the network node, the destination node, and the intermediate nodes.

* * * * *

UNITED STATES PATENT AND TRADEMARK OFFICE
CERTIFICATE OF CORRECTION

PATENT NO. : 7,564,780 B2  Page 1 of 1
APPLICATION NO. : 10/759698
DATED : July 21, 2009
INVENTOR(S) : Richard R. Rabbat et al.

It is certified that error appears in the above-identified patent and that said Letters Patent is hereby corrected as shown below:

Col. 9, Ln. 56: After "of claim" delete "12" and insert -- 11 --.

Signed and Sealed this

Sixteenth Day of February, 2010

David J. Kappos
*Director of the United States Patent and Trademark Office*